United States Patent [19]
Cai

[11] Patent Number: 5,929,420
[45] Date of Patent: Jul. 27, 1999

[54] METHOD FOR READING DISTORTED BAR CODES

[75] Inventor: Joseph Cai, Holbrook, N.Y.

[73] Assignee: Symbol Technologies, Inc., Holtsville, N.Y.

[21] Appl. No.: 08/843,751

[22] Filed: Apr. 22, 1997

Related U.S. Application Data

[63] Continuation-in-part of application No. 08/538,067, Oct. 2, 1995, abandoned.

[51] Int. Cl.⁶ .................................................... G06K 7/10
[52] U.S. Cl. ...................................... 235/462.07; 235/494
[58] Field of Search ................................ 235/462.07, 494

[56] References Cited

U.S. PATENT DOCUMENTS

| | | |
|---|---|---|
| 3,701,097 | 10/1972 | Wolff . |
| 3,744,026 | 7/1973 | Wolff . |
| 4,323,772 | 4/1982 | Serge . |
| 4,757,206 | 7/1988 | Ohta . |
| 4,989,074 | 1/1991 | Matsumoto . |
| 5,369,260 | 11/1994 | Schuessler . |
| 5,408,698 | 4/1995 | Serizawa et al. . |
| 5,412,196 | 5/1995 | Surka . |
| 5,675,137 | 10/1997 | Haagen et al. ..................... 235/462.07 |

OTHER PUBLICATIONS

AIM USA Specification ANSI/AIM BCI-1995 "A New Decode Algorithm for Binary Bar Codes" reprinted from "Pattern Recognition Letters" 15 (1994).

*Primary Examiner*—Harold I. Pitts
*Attorney, Agent, or Firm*—Gary Serbin

[57] ABSTRACT

Bar code decoding methods and apparatus are disclosed wherein prototype characters are generated using calculated bar code distortion attributes. The vector distance measurements between the scanned bar code characters and the prototype characters are advantageously utilized to provide advanced and improved decoding.

53 Claims, 5 Drawing Sheets

| CHARACTER PATTERN | VALUES | CHARACTER PATTERN | VALUES |
|---|---|---|---|
| 1 | 100100001 | M | 101000010 |
| 2 | 001100001 | N | 000010011 |
| 3 | 101100000 | O | 100010010 |
| 4 | 000110001 | P | 001010010 |
| 5 | 100110000 | Q | 000000111 |
| 6 | 001110000 | R | 100000110 |
| 7 | 000100101 | S | 001000110 |
| 8 | 100100100 | T | 000010110 |
| 9 | 001100100 | U | 110000001 |
| 0 | 000110100 | V | 011000001 |
| A | 100001001 | W | 111000000 |
| B | 001001001 | X | 010010001 |
| C | 101001000 | Y | 110010000 |
| D | 000011001 | Z | 011010000 |
| E | 100011000 | - | 010000101 |
| F | 001011000 | . | 110000100 |
| G | 000001101 |   | 011000100 |
| H | 100001100 | * | 010010100 |
| I | 001001100 | $ | 010101000 |
| J | 000011100 | / | 010100010 |
| K | 100000011 | + | 010001010 |
| L | 001000011 | % | 000101010 |

METHOD FOR READING DISTORTED BAR CODES

This invention relates to bar code decoding, and more particularly to an improved method and apparatus for decoding bar codes. This application is a continuation-in-part of U.S. patent application Ser. No. 08/538,067, filed Oct. 2, 1995, now ABN.

BACKGROUND OF THE INVENTION

Bar codes are currently in use in numerous applications, such as, for example, for identifying objects for purchase, where a bar code scanner and a decoder are provided at the checkout counters to read and decode the bar code.

Bar codes can be generally divided into two types of encoded formats; i.e., a binary encoded format and a delta encoded format. In the case of bar codes of the binary format type, the bars and spaces are specified to have only two different widths (i.e., wide or narrow). The bar code is read by a scanner which forms a digital signal representative of the bar code. The digital signal is provided to a decoder which decodes the bar code and outputs the decoded character string. For example, an example of a nearly ideal digital signal for an encoded "3" character in Code 39 format is a bar code where the widths of the various bars and spaces are measured as 40, 20, 39, 41, 21, 20, 19, 20 and 21 units in width, respectively. As can be appreciated, in this example, due to the clear differentiation between the widths of the narrow and wide elements, it is easy for a decoder to distinguish between the wide and narrow elements.

It is known that in practical applications, the digital signal representative of the bar code can be significantly distorted for many different reasons. For example, printing imperfections, ink spreading, curved printed surfaces, convolution errors due to laser spot size, etc., are illustrative of events which contribute to the distortion of the digital signal. In distorted digital signals, it becomes more difficult to differentiate between the wide and narrow elements.

A sample decoding algorithm for Code 39 characters is given on page 9 of the USS-39Uniform Symbology Specification (ANSI-BC1-1995) published by AIM USA, approved by American National Standards Institute, Inc. on Aug. 16, 1995, and is incorporated herein by reference.

Some currently known decoders process the bars and spaces separately so as to reduce the effects of printing imperfections. The known decoders test the ratio of the maximum and the minimum bar width within a character, and if the ratio is not greater than the predetermined value, the character is determined to be all narrow. If the ratio is greater than a predetermined value, the known decoders set a threshold for the bars and a separate threshold for the spaces.

Each bar and space of the character is then compared against the respective threshold, and based on the comparison, are determined to be either wide or narrow.

A further problem with the known decoders is that they occasionally misdecode distorted digital signals representative of bar codes (i.e., provides an incorrect decoded character). Generally, as attempts are made to have the decoders more aggressive (i.e., higher decoding rate), the rate of misdecoding increases.

SUMMARY OF THE INVENTION

It is an object of the present invention to provide an apparatus and method for decoding digital signals representative of bar codes.

It is a further object of the present invention to provide an apparatus and method for decoding severely distorted digital signals representative of bar codes.

The present invention calculates a set of distortion attributes, for a particular symbology, contained within a bar code signal. These distortion features combine within themselves individual distortions caused by printing imperfections, ink spreading, as well as distortions caused by the reading device. In case of a bar code read by a laser scanner, one of the signal distortion sources is a laser spot size convolution distortion. Once the distortion attributes have been calculated, the system modifies a number of standard symbology characters stored in a system memory and forms a group of prototype characters. For each scanned encoded character, the system calculates a vector distance to each prototype character. Based on the values of the calculated distances, the system determines the best match prototype character for the encoded character under test. This way, each encoded character is determined to correspond to one prototype character, and its associated information.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

DETAILED DESCRIPTION OF A SPECIFIC EMBODIMENT

A number of specific embodiments of the invention are described herein. It will be understood that these embodiments are presented for the purpose of illustration and not as limiting the scope of the invention.

Figure 1:
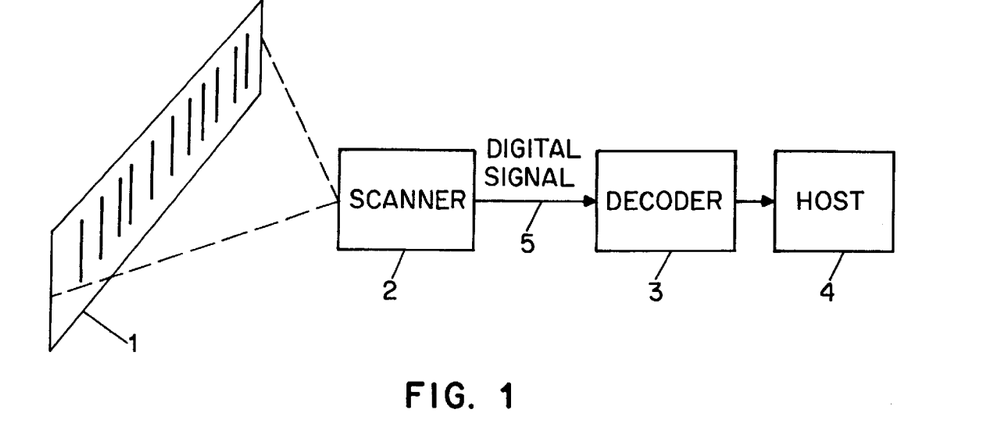
FIG. 1 is a block diagram of the system of the present invention.

FIG. 1 illustrates in block form a scanner system for reading indicia 1 of different light reflectivity such as bar code symbols. Such symbols comprise a series of bars and spaces of varying widths, where the bars and spaces are arranged in predetermined patterns which correspond to one character out of a predetermined character set. The most widely used bar codes in current use can be classified as either a binary type code or a delta type code. The binary codes are characterized in that each bar and each space should only be of one of two widths (i.e., wide or narrow). Code 39 is an example of a widely used binary code. An apparatus and method of decoding Code 39 type symbols will be described herein for illustrative purposes, with the understanding that the invention is equally applicable to decoding other types of binary codes.

A conventional scanner 2, such as that disclosed in U.S. Pat. Nos. 4,387,297, 4,758,717, and 4,806,742 which are herein incorporated by reference, generates a laser light beam which is swept across the indicia 1. A portion of the laser light is reflected off the indicia 1 and is received back at the scanner 2 where it is converted to an analog signal. The scanner 2 then converts the analog signal into a digital signal 5 representing the indicia (i.e., a logic "1" signal represents a space and a logic "0" signal represents a bar). The digital signal is then provided to a decoder 3 which measures the duration of the spaces and bars and, based on such measurements, determines which characters the indicia 1 represents. The decoder 3 then communicates to a host computer 4 the decoded characters.

Figure 2:
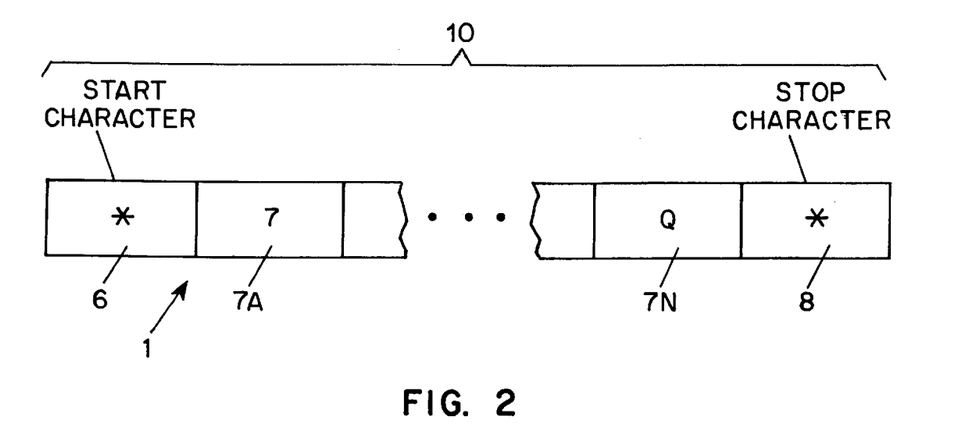
FIG. 2 is representative of the structure of a binary type bar code to be decoded by the system of the present invention.
Figure 3:
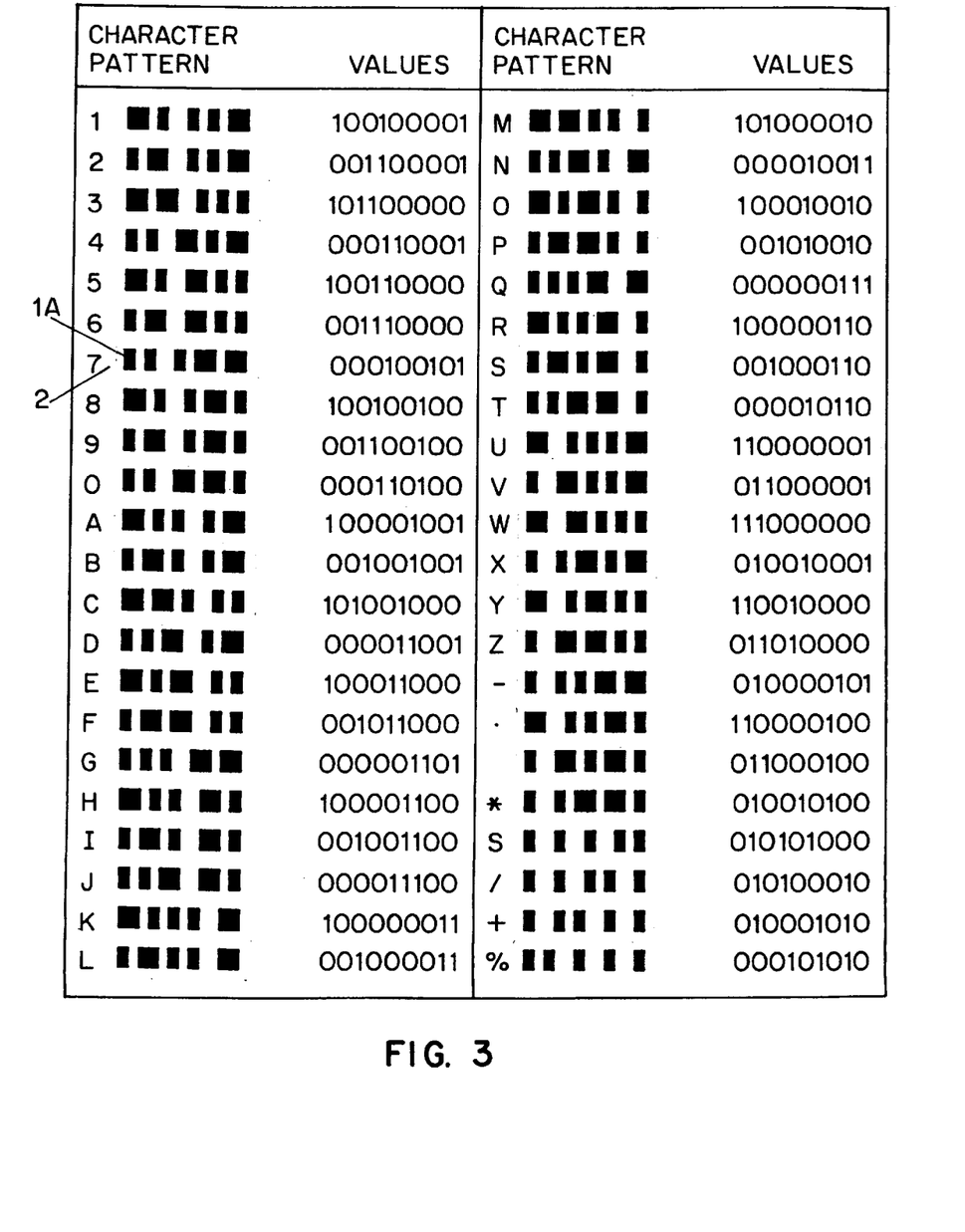
FIG. 3 shows the bar code configurations for extended Code 39 bar codes.

The structure of an indicia 1 conforming to the Code 39 Standard is shown in FIG. 2. The indicia 1 includes a leading start character 6, a number of data characters 7A–7N, and a trailing stop character 8. The start character 6 and the stop character 8 are predefined as the asteric character "*". Each data character 7A–7N is one of a possible forty three (excluding the "*" character) different characters. Each character in Code 39 is represented by nine elements (5 bars and 4 spaces). Three of the nine elements are wide and the remaining six elements are narrow. FIG. 3 illustrates the bar and space pattern for each of the forty four different Code 39 characters. Each character is shown as including a number of wide and narrow bars and spaces. A binary representation of each character is shown, where a binary value "0" represents a narrow element and a binary value "1" represents a wide element. For example, referring to the "*" start/stop character shown in FIG. 3, the sequence of bars and spaces from left to right is: narrow bar "binary 0", wide space "binary 1", narrow bar "binary 0", narrow space "binary 0", wide bar "binary 1", narrow space "binary 0", wide bar "binary 1", narrow space "binary 0", and narrow bar "binary 0". Accordingly, the binary representation of the "*" character is 010010100.

In a binary format, such as, for example Code 39, there are eight possible transitions which can occur between adjacent elements. The eight transitions are shown in Table A. The first and second columns in Table A list the first and second elements respectively. In the third column an identifying name is provided for each possible transition.

TABLE A

| FIRST ELEMENT | SECOND ELEMENT | TRANSITION IDENTIFIER |
|---|---|---|
| NARROW SPACE | NARROW BAR | NsNb |
| NARROW SPACE | WIDE BAR | NsWb |
| WIDE SPACE | NARROW BAR | WsNb |
| WIDE SPACE | WIDE BAR | WsWb |
| NARROW BAR | NARROW SPACE | NbNs |
| NARROW BAR | WIDE SPACE | NbWs |
| WIDE BAR | NARROW SPACE | WbNs |
| WIDE BAR | WIDE SPACE | WbWs |

It has been determined that the distortion for each transition shown in Table A generally remains relatively consistent in neighboring characters in a given character string 10. Accordingly, if the amount of distortion for each transition in a given character string 10 can be determined, this information can be used by the decoder 3 in decoding distorted bar codes in the neighboring characters in the character string 10.

Figure 4:
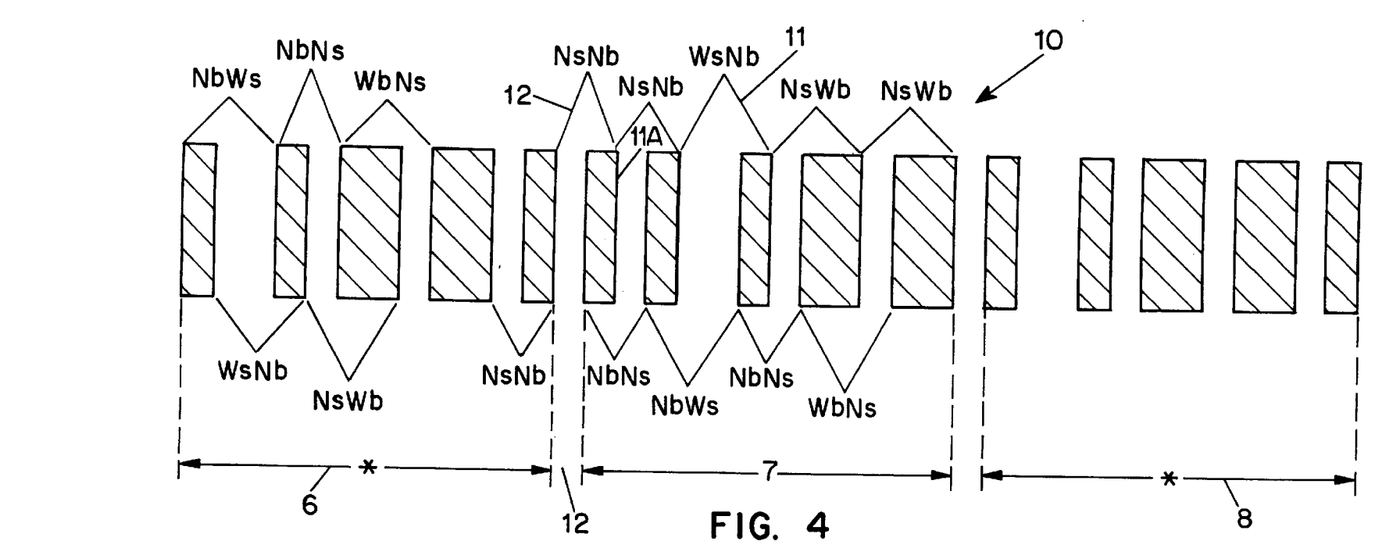
FIG. 4 shows in greater detail a bar code to be decoded by the system of the present invention.

In accordance with the principles of the present invention, the distortion of each transition listed in Table A, with the exception of the $W_bW_s$ and the $W_sW_b$ transitions, can be ascertained by scanning and measuring the start/stop character 6. Referring to FIG. 4, character string 10 comprises start/stop characters 6 and 8 which surround the data characters 11 (i.e., data characters shown as a "7" character). As shown in FIG. 4, the start/stop character 6 includes the $W_sN_b$, $N_sW_b$, $N_sN_b$, $N_bW_s$, $N_bN_s$ and $W_bN_s$ transitions. In real world applications, the character string 10 may be distorted due to, for example, ink spreading or the under application of ink; however, for illustrative purposes herein, the character string 10 is shown in FIG. 4 without distortion with the understanding that the following discussion also applies to distorted character strings.

Figure 5:
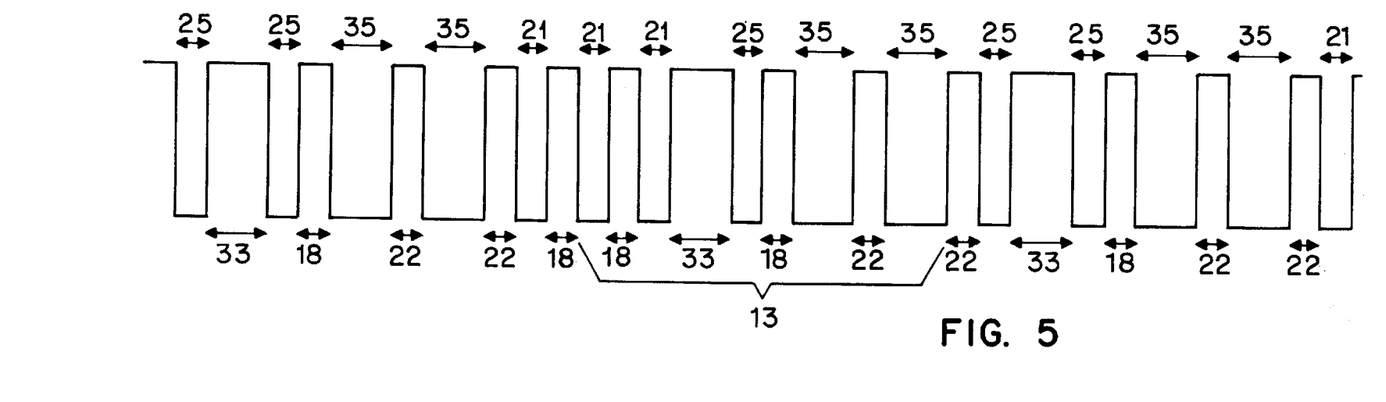
FIG. 5 shows the digital signal formed by the system of the present invention when scanning the bar code of FIG. 4.

FIG. 5 illustrates the digital signal 5 output from the scanner 2 when the character string 10 is scanned by a scanner 2. The width of each pulse in the digital signal is indicated in FIG. 5. The digital signal 5 is distorted as compared to the character string 10 (i.e., due to spot size, convolution error, character surface warpage, reading angle, etc.). For each of the transitions types in the start/stop character 6, the decoder 3 measures the width of the second element and stores the measured widths in temporary memory (not shown). For the two transitions (the $W_bW_s$ and the $W_sW_b$ transition) which are not included in the start/stop character 6, there is no way to measure the widths of the second elements in the $W_bW_s$ transitions. However, based on the measured widths, stored in the temporary memory, of the second elements of the other transitions, estimated values can be obtained for the widths of the second elements in $W_sW_b$ transitions, respectively, and the estimated widths stored in the temporary memory.

In more detail, the width of the $W_s$ component of the $W_bW_s$ transition can be estimated in accordance with equation #1:

---

EQUATION #1

Width of the Ws element in the WbWs transition equals
 width of Ns in the WbNs transition minus
 width of Ns in the NbNs transition plus
 width of Ws in the NbWs transition

---

The width of the $W_b$ component of the $W_sW_b$ transition can be estimated in accordance with equation #2:

---

EQUATION #2

Width of the Wb element in the WsWb transition equals
 width of Nb in the WsNb transition minus
 width of Nb in the NsNb transition plus
 width of Wb in the NsWb transition

---

As an illustrative example, assume that the start/stop character 6 is scanned and the following measurements obtained:

width of $N_b$ in the $N_sN_b$ transition=21
width of $W_b$ in the $N_sW_b$ transition=35
width of $N_b$ in the $W_sN_b$ transition=25
width of $N_s$ in the $N_bN_s$ transition=18
width of $W_s$ in the $N_bW_s$ transition=33
width of $N_s$ in the $W_bN_s$ transition=22

In accordance with Equation #1, the estimated width of the $W_b$ element in the $W_sW_b$ transition equals 25−21+35= 39.

In accordance with Equation #2, the estimated width of the $W_s$ element in the $W_bW_s$ transition equals 22−18+33=37.

Accordingly, Table B below is stored in temporary memory:

TABLE B

| TRANSITION TYPE | WIDTH OF 2ND ELEMENT |
|---|---|
| NsNb | 21 |
| NsWb | 35 |
| WsNb | 25 |
| WsWb | 39 |
| NbNs | 18 |
| NbWs | 33 |
| WbNs | 22 |
| WbWs | 37 |

In accordance with the Code 39 Standard, the width of the inter-character space 12 between characters varies, provided that the inter-character space is consistent throughout the character string 10. After scanning the start/stop character 6, the scanner measures the inter-character gap 12 between the start/stop character 6 and the first data character 11. The measured value for the inter-character space 12 is then compared against the measured width of the second $N_s$ element of the NbNs transition (i.e., the width retrieved from temporary memory) and the measured width of the $W_s$ element of the $N_bW_s$ transition (i.e., width retrieved from temporary memory) to determine the width of the inter-character spacing 12 and the result stored in the temporary memory. In the example shown in FIG. 4, the inter-character space 12 is shown as narrow (i.e., the measured width is the same as the stored width of the second $N_s$ element of the $N_bN_s$ transition.

The decoder 3 includes a prototype memory (not shown) for storing a prototype character (a nine dimensional vector Y) for each of the forty-four possible Extended Code 39 characters. Each bar and space of a prototype character is adjusted to have a similar degree of distortion as the elements stored in temporary memory (i.e., Table B). More particularly, each time a start/stop character 6 and the following inter-character space 12 are scanned, each of the forty-four prototype characters in the prototype lookup table are adjusted on the basis of the measured and/or estimated width of the elements stored in the temporary memory (i.e., Table B).

In an alternate embodiment, the system preselectes a subset of Extended Code 39 characters from the forty-four character set, and generates a prototype character for each preselected Extended Code 39 character. The preselection identifies and rejects the Extended Code 39 characters that could not possibly correspond to the encoded character, under test, in the barcode. For example, if the first element of an encoded character under test is a narrow bar, the system rejects all the Extended Code 39 characters starting with a wide bar and generates prototypes only for the Extended Code 39 characters starting with a narrow bar. The preselection is repeated for each encoded character under test. The preselection step reduces the amount of computation required in decoding each encoded character. If no preselection is made, than one prototype character is formed f As h of the forty-four Extended Code 39 characters.

As an illustrative example, the prototype of the "7" character, based on the measured and/or estimated widths stored in temporary memory is formed. Referring to FIGS. 3 and 4, the "7" character consists of five bars and four spaces having nine different transitions therebetween as viewed from left to right. The first bar 11A in the "7" character is fixed as a narrow bar. However, the preceding space (i.e., an inter-character space 12) can have various widths. Accordingly, to determine the first transition, the temporary memory is read to determine the width of the inter-character space 12. In this illustration, the inter-character space 12 is narrow, and therefore, the first transition is $N_sN_b$. The remaining transitions for a "7" character are always fixed as $N_bN_s$, $N_sN_b$, $N_bW_s$, $W_sN_b$, $N_bN_s$, $N_sW_b$, $W_bN_s$, $N_sW_b$.

For each transition in the "7"=character 11, the temporary memory is interrogated and the width associated with the particular transition type is used to set up the prototype. For example, using the values stored in Table B, the prototype for the "7" character equals 21, 18, 21, 33, 25, 18, 35, 22, 35. The prototype for each of the remaining Code 39 characters listed in FIG. 3 can be set in a similar manner and a prototype table formed in the memory. In this manner, each of the forty-four prototypes in the prototype table is a nine dimensional vector $Y=(Y_1, Y_2, \ldots, Y_i \ldots, Y_9)$ comprising the widths values for the respective elements, where the width elements correspond to the distortion previously determined by the scanning and measuring of the start/stop character 6. This process of updating the prototype table is repeated each time a new character in the string 10 is scanned.

After the prototype table is updated, the portion 13 of the digital signal 5 which is associated with each character 11 in the character string 10 is measured and width of each of the nine elements in the character is obtained and stored as nine dimensional vector $X=(x1, x2, \ldots, Xi, \ldots, x9)$ where i=elements 1–9. The nine dimensional vector X is then compared against each one of the forty-four vectors Y stored in the prototype table to determine which vector Y is the maximum distance from the X vector.

There are various methods available for determining the distance between the X vector and each of the Y vectors. For example, a Hamming-like distance measurement can be calculated in accordance with equation 3:

EQUATION 3:

$$D = \sum_{i=1}^{9} \frac{|Xi - Yi|}{Ni}$$

where:

$X_i$ is the width of the ith element in the character to be decoded.

$Y_i$ is the width of the ith element of one of the prototypes in the prototype table.

$N_i$ is a normalization factor which depends on the previous element i–1 of the prototype and the values stored in the temporary memory. For example;

If element i–1 is narrow bar $$N_i = N_bW_s - N_bN_s$$

If element i–1 is wide bar $$N_i = W_bW_s - W_bN_s$$

If element i–1 is narrow space $$N_i = N_sW_b - N_sN_b$$

If element i–1 is wide space $$N_i = W_sW_b - W_sN_b$$

After the distance between vector X and each prototype vector Y is calculated, the minimum distance is compared against a predetermined threshold. Provided that the minimum distance is less than the minimum threshold, the character is determined to be the character which corresponds to the prototype vector Y which provided the minimum distance.

In an alternate embodiment, the system selects two prototype vectors Y having the two lowest separation distances to vector X under test, with each of the separation distances being lower then the minimum threshold distance. The system then calculates the separation between the two Y vectors and if the separation is greater then a predetermined Y separation threshold, the encoded character is determined to be the character corresponding to the prototype vector Y which provides the lowest separation distance.

Figure 7:
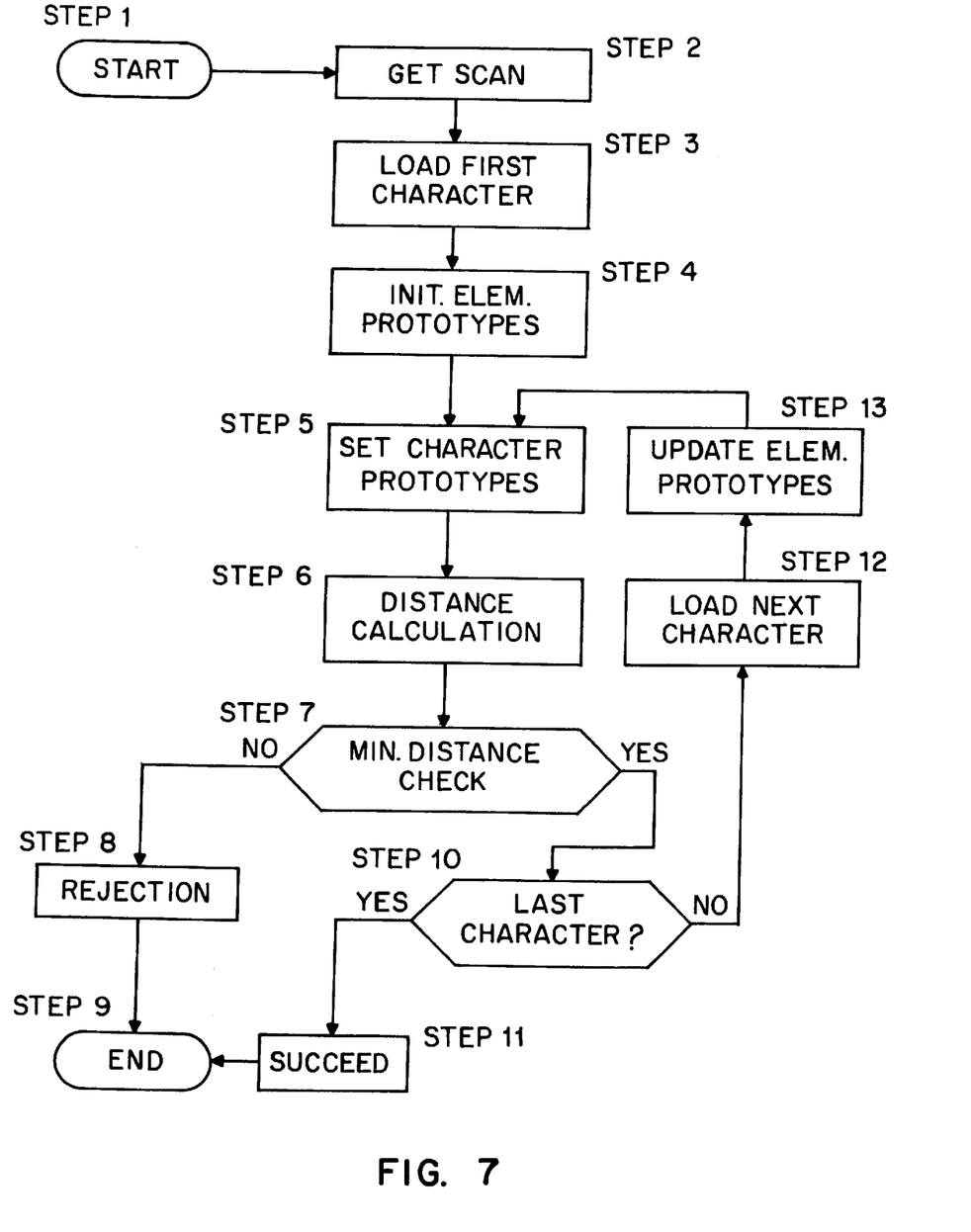
FIG. 7 is a flow-chart of a specific embodiment of the present invention.

As a more specific embodiment of the present invention, the decoder 3 comprises a microcomputer (not shown) for decoding the digital signal 5. FIG. 7 is a flowchart illustrating the operation of the microcomputer for decoding the scanned indicia 1 in accordance with the present invention.

The flowchart starts at Step 1. At Step 2, the decoder 3 receives the scanned character string in the form of the digital signal 5.

At Step 3, the first character, such as a start character, is checked and based upon the measured widths of the elements in the start character, at Step 4, initial element prototypes, as shown for example in Table B, are formed and stored in memory.

At Step 5, the initial element prototypes are used to set up a prototype vector Y for each possible character.

At Step 6, the next character in the character string is stored as vector X. The distance between vector X and each vector Y is calculated.

At Step 7, the minimum distance calculated at Step 6 is compared against a minimum threshold. If the minimum distance calculated is not less than the minimum threshold, progress is made to Step 8 where the scan is rejected. If the minimum distance is less than the minimum threshold, then it is determined that the character decoded is the character corresponding to the one vector Y which yielded the minimum distance result in Step 6.

At Step 10, a check is made whether the last character has been decoded. If yes, progress is made to Step 11 where the decoding is deemed a success. If no, at Step 12 the next character is loaded and the element prototypes are updated at Step 13.

Steps 5, 6, 7, 10, 12 and 13 are successively repeated until all remaining characters are decoded.

Equation 3 above is illustrative of a particular formula which can be used to determine the distance between X and Y. However, the following equations 4–14 are illustrative of different formulas which can be used to determine the distance D:

EQUATION 4: Single side Humming-like distance $$D = \sum_{i=1}^{9} Di$$

wherein, if $Y_i$ is a wide element and $X_i > Y_i$, or $Y_i$ is narrow and Xi<Yi, then Di=0: otherwise $$Di = \frac{|Xi - Yi|}{Ni}$$

EQUATION 5: Square Humming-like distance $$D = \sum_{i=1}^{9} \left(\frac{Xi - Yi}{Ni}\right)^2$$

EQUATION 6: Qubic Humming-like distance $$D = \sum_{i=1}^{9} \left(\frac{|Xi - Yi|}{Ni}\right)^3$$

EQUATION 7:
D=Diagonal distance normalized by element (diag_e).
For example, the following is an example of the calculation of diag_e for illustrative values of $X_i$ and $Y_i$: It should be noted that ham $d_i$ is the values from Equation 4. If $\blacktriangle_i = (X_i - Y_i)$ changes sign, then the distance of the next element will be compensated by the previous $\blacktriangle_{i-1}$.

| Xi | 20 | 38 | 22 | 20 | 38 | 18 | 38 | 22 | 22 |
|---|---|---|---|---|---|---|---|---|---|
| Yi | 22 | 38 | 19 | 23 | 19 | 24 | 43 | 39 | 18 |
| ▲i | -2 | 0 | 3 | -3 | 19 | -6 | -5 | -17 | 2 |
| ham_di | 2 | 0 | 3 | 3 | 19 | 6 | 5 | 17 | 2 |
| diag_e | 2 | 0 | 3 | 0 | 16 | 0 | 5 | 17 | 0 |

For $D = \sum_{i=1}^{9} Di$,

D (humming-like) = 57
D (diagonal) = 43

EQUATION 8: Character Normalization diagonal distance
D=Diagonal distance normalized by character (diag_c).
EQUATION 9: Square Diagonal distance
D=Diagonal distance normalized by elements using square values.
EQUATION 10: Minimum Square Diagonal Distance
D=Minimum square diagonal distance.
In equation 7, the $\blacktriangle_i$ is compensated by the previous $\blacktriangle_{i-1}$.
In Equation 10, the $\blacktriangle_i$ is compensated by the previous $\blacktriangle_{i-1}$ and the following $\blacktriangle_{i+1}$ so as to minimize the summation of their square values.
EQUATION 12: Propagating Diagonal Distance
D=Propagating diagonal distance.
This distance calculation approach propagates the remaining value of $\blacktriangle_{i-1}$, after the compensation to the $\blacktriangle_i$, to the following $\blacktriangle_{i+1}$. This is done if the previous $\blacktriangle_{i-1}$ is more than enough to compensate the next $\blacktriangle_i$.
EQUATION 13: Edge Shift Distance
D=Edge shift distance
The assumption is made that in real world applications the warping is actually very small, and the difference between elements is caused only by the edge shift. Accordingly, only the edge shift is considered in calculating the distance D.
EQUATION 14: Distortion Binary Distance
D=Distortion Binary Distance
The idea is to judge each element as a "1" or a "0", using the four different bars and four different spaces from the start/stop characters.

While the above equations 4–14 are illustrative of various methods of determining the distance $D_i$ between $X_i$ and $Y_i$, other distance measurement formulas and methods can be employed in accordance with the principle of the present invention.

Decoding on the basis of the minimum distance D, where D is calculated using any one of the above methods, provides for a greater accuracy of decoding as compared against the prior known decoding methods. More particularly, when scanning a large representative sampling of bar codes having varying types and degrees of distortion, the decoding rate is increased as compared with the prior art decoders. Further, the present invention decreases the number of misdecodes (i.e., incorrectly interpreting a character as a different character) as compared to the prior art decoders.

A further embodiment of the present invention is an improved method, apparatus and system for decoding delta type bar codes. This embodiment will be illustrated using standard UPC bar codes with the understanding that the invention is applicable to other delta type bar codes.

Each UPC bar code character is comprised of four elements, where each element is either one unit, two units, three units or four units wide. Further, the sum of the four elements of any given character totals seven units.

Figure 6:
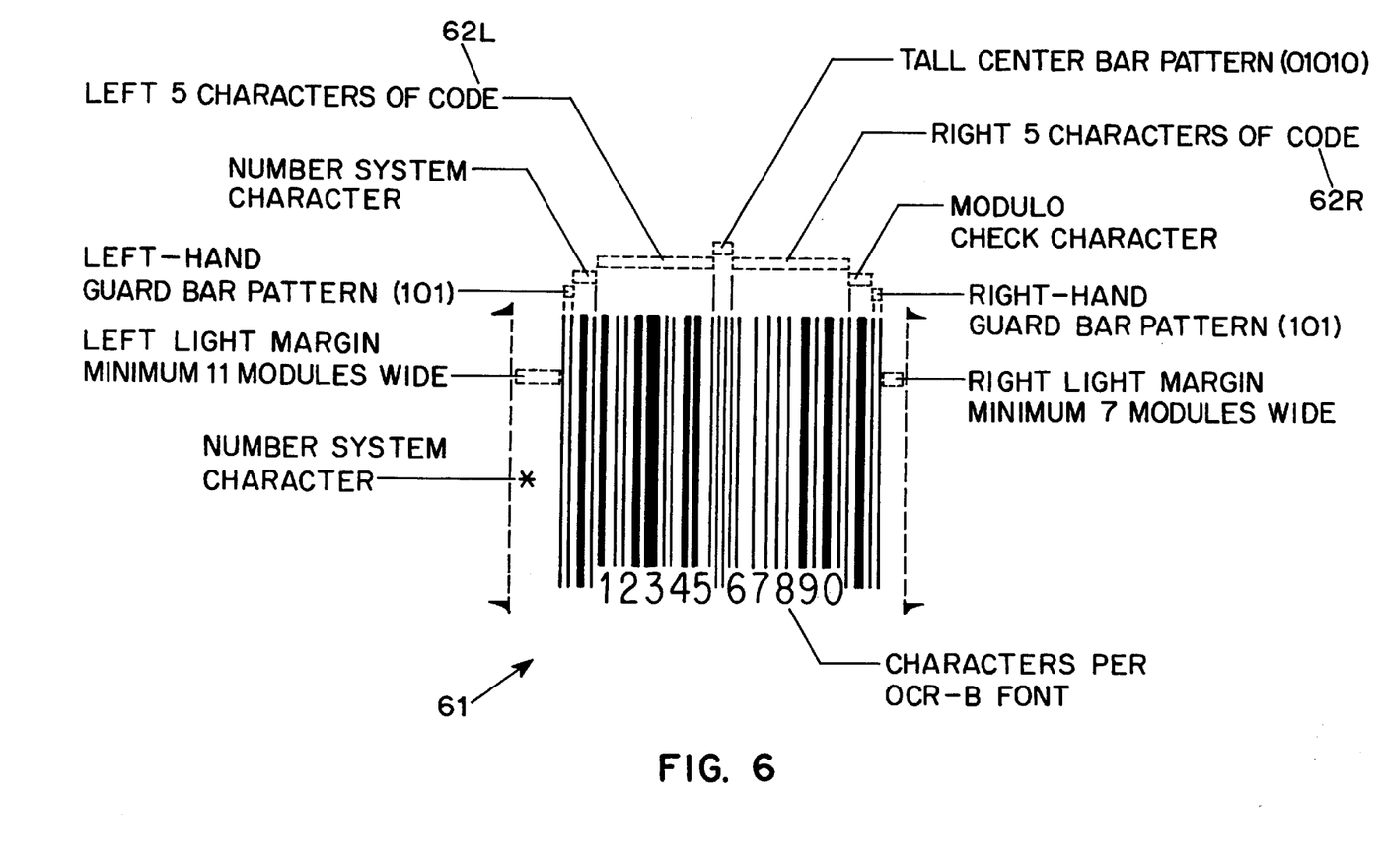
FIG. 6 is representative of a delta type bar code to be decoded by a second embodiment of the present invention.

Referring to FIG. 6, an illustrative UPC character string is shown. The UPC code 61 includes six left characters of code 62L and six right hand characters of code 62R. Table C below shows the left and right character in binary format for each of the possible characters "0–9". In the binary representation, each character is represented by seven binary bits, where a zero "0" represents a space having a width of one unit, and a one "1" represents a bar having a width of one unit. In the Table C, under each binary representation, is a description of the widths of each of the four elements in the character. For example, the character "4" positioned as a left character, is formed as a space having one unit of width followed by a bar having one unit of width followed by a space having three units of width followed by a bar having two units of width.

TABLE C

| CHARACTER | LEFT-CHARACTER | RIGHT-CHARACTER |
|---|---|---|
| 0 | 0001101 | 1110010 |
|   | 3211 | 3211 |
| 1 | 0011001 | 1100110 |
|   | 2221 | 2221 |
| 2 | 0010011 | 1101100 |
|   | 2122 | 2122 |
| 3 | 0111101 | 1000010 |
|   | 1411 | 1411 |
| 4 | 0100011 | 1011100 |
|   | 1132 | 1132 |
| 5 | 0110001 | 1001110 |
|   | 1231 | 1231 |
| 6 | 0101111 | 1010000 |
|   | 1114 | 1114 |
| 7 | 0111011 | 1000100 |
|   | 1312 | 1312 |
| 8 | 0110111 | 1001000 |
|   | 1213 | 1213 |
| 9 | 0001011 | 1110100 |
|   | 3112 | 3112 |

In accordance with the principles of the present invention, the UPC character string 61 is scanned by a scanner 2 such as that shown in FIG. 1. It should be noted that scanning can be omnidirectional (i.e., scanning the UPC character string of FIG. 6 from left-to-right or from right-to-left). The digital signal 5, which is representative of the character string 61 is output to the decoder 3 which determines which characters are represented by the character string 61. The decoder 3 determines the width of each of the elements in the character string, and for each character, normalizes the widths of each of the four elements so that the total width equals seven hundred ("700"). The four normalized widths are stored in a four dimensional vector X (i.e., $X=(X_1,X_2,X_4)$). For each scan, the decoder 3 calculates a degree of distortion as a function of the normalized widths stored in vector X.

The degree of distortion of each element in the bar code can be calculated by the decoder 3 in accordance with the following equation:

$$\text{Degree of Distortion}=|(100*\text{TRUNCATED}((X_i+50)/100))-X_i|$$

For example, assuming that the normalized values for a character are determined by the decoder 3 to be space=$X_1=178$, bar=$X_2=280$, space=$X_3=161$, and bar=$X_4=81$, and where the bar $X_{i-1}$ preceding the first space is equal to 93. Degree of distortion in $X_1$, $X_2$, $X_3$ and $X_4$ are:

$$D1=|(100*\text{TRUNCATED }((178+50)/100))-178|=22$$

$$D2=|(100*\text{TRUNCATED }((280+50)/100))-280|=20$$

$$D4=|(100*\text{TRUNCATED }((161+50)/100))-161|=39$$

$$D4=|(100*\text{TRUNCATED }((81+50)/100))-81|=19$$

This procedure is performed for all the elements of the scanned bar code.

Each element under test within a particular element combination is assigned a weighting factor. The weighting factor represents an error level of the width of a scanned element under test, given that all the other elements within the element combination are known, or presumed to be known. Table D provides various weighting factors selected by the applicant for different UPC elements within any two-element combination. The weighting factor for each element under test is assigned based upon the width of the preceeding element.

TABLE D

| ei-1 | ei | Qi |
|---|---|---|
| 1 unit | 1 unit | 0 |
| 1 unit | 2 units | −1 |
| 1 unit | 3 units | −2.5 |
| 1 unit | 4 units | −3.5 |
| 2 units | 1 unit | 1 |
| 2 units | 2 units | 0 |
| 2 units | 3 units | −0.5 |
| 2 units | 4 units | −1 |
| 3 units | 1 unit | 2.5 |
| 3 units | 2 units | 0.5 |
| 3 units | 3 units | 0 |
| 3 units | 4 units | 0 |
| 4 units | 1 unit | 3.5 |
| 4 units | 2 units | 1 |
| 4 units | 3 units | 0 |
| 4 units | 4 units | 0 |

For example, if an element under test (ei) was determined to be 4 units wide and the preceeding element($e_{i-1}$) was also four units wide, then the assigned eror level(weighting factor) is 0. If, on the other hand, the preceeding element is two units wide, then the assigned weighting factor is −1.

In an alternate embodiments, different weighting factor tables are possible. For example, a weighting table for more then two element combinations is possible. Also, the weighting factor for an element under test may depend upon the widths of both preceeding and succeeding elements.

The average distortion degree in a scan can be obtained by averaging all of the absolute values of the individual element distortions divided by their respective weighting factors. In a transition from a wide element to a narrow element, the narrow element is expected to be represented wider then its actual width, and the wide element is expected to be represented narrower then its actual width. For the purpose of calculating the average distortion, if the calculated element distortion is in the opposite direction from the expected element distortion, based upon the knowledge of the width of the previous element, the individual element distortion is set to 0. In the above example one degree of distortion was calculated for each one of the four elements. The order of the elements was: bar preceeding the first space=93, X1=178, X2=280, X3=161 and X4=81. These element widths were rounded off to a nearest whole number, with the value of 100 corresponding to a 1 unit of width. The above sample pattern provides us with the following two-element combinations:

| Xi-1 | corresponding ei-1 unit width rounded off | Xi | corresponding ei rounded off | Weighting Factor Qi (from table D) |
|---|---|---|---|---|
| 93 | 1 | 178 | 2 | −1 |
| 178 | 2 | 280 | 3 | −0.5 |
| 280 | 3 | 161 | 2 | 0.5 |
| 161 | 2 | 81 | 1 | 1 |

The Degree of Distortion In a Scan=(|22/ (−1)|+|20/ (−0.5)|+|0/ (0.5)|+|0/(1)|)/4=15

The degree of distortion in a scan has been rounded off to a nearest whole number. In other embodiments one may use the actual calculated number without rounding off to the nearest whole number.

Notice, that for the $X_3$ and $X_4$ elements, the width of which was determined to be 161 and 81 respectively, the values of the calculated degrees of distortions ($D_2$ and $D_3$)were set to zero. The reason for this is the following: $e_2$ element, preceeds the $e_3$ element and is rounded off to 3 units of widths. $X_3$ is measured to be 161 and $e_3$ is rounded off to 2 units of width. Therefore, what we have is a wider element preceeding a narrower element. In case of such transition, one would expect $X_3$ to appear wider than 200, yet it was measured to be lower than 200 (measured to be 161). In the present case, the calculated element distortion $D_3$ is in the opposite direction from the expected element distortion. In such a case, the value for D3 is set ot zero and that is the value used in calculating of the avarage scan degree of distortion. The same analysis is apllied to $D_4$, which was also set to zero in the formula.

Using the above formula, the average degree of distortion in the sample scan=15.

The decoder 3, next uses the normalized widths stored in vector X to select all of the possible UPC standard characters to which the normalized data in vector X could possibly correspond by applying the following test to each normalized width value $_{xi}$ in vector X:

If Xi≦100 then 1 unit element width
If 100<Xi≦200 then 1 or 2 units element width
If 200<Xi≦300 then 2 or 3 units element width
If 300<Xi≦400 then 3 or 4 units element width
If 400<Xi then 4 units element width Once again using the example where vector X (space=x1=178, bar=X2=280, space=x3=161, and bar=x4=81), the various possible widths for each normalized width value xi are:

x1=178 and therefore is a space 1 or 2 units wide
x2=280 and therefore is a bar 2 or 3 units wide
x3=161 and therefore is a space 1 or 2 units wide
x4=81 and therefore is a bar 1 unit wide Based on the foregoing, where X=(178, 280, 161, 81), the following combinations can be formed:

1211 (i.e., space 1 unit wide, bar 2 units wide, space 1 unit wide, bar 1 unit wide)
1221
1311
1321
2211
2221
2311
2321

Each of the above combinations is compared against the set of allowable UPC characters indicated in Table C. Since the UPC character strings 61 can be scanned in two directions, the above combinations must be compared against the left-characters in Table C as read from left to right, and also against the right-characters in Table C as read from right to left. For example, the only combinations which are valid characters in Table C are 2311 (i.e., right-character "4" as read from right to left), 2221 (i.e., left-character "1"), and 1321 (i.e., right-character "5" as read from right to left). The combinations that match values stored in Table C are referred to hereinafter as vectors En (i.e., $e_1$, $e_2$, $e_3$, $e_4$). Accordingly, the combinations which are not found in the Table C are dropped from further consideration and further processing is performed on the combinations found in Table C (i.e., $E_1$(2311), $E_2$(2221) and $E_3$(1321) to determine the best match.

For each combination $E_n$ which was found in Table C, the decoder 3 forms in memory (not shown) a prototype ector Y (i.e., Y=($Y_1$, $Y_2$, $Y_3$ $Y_4$). Each of the four elements of each of the prototypes is set in accordance with the following formula:

$Y_i$=(100*$e_i$)+($Q_i$* Scan Degree of Distortion) where $e_i$ equals 1, 2, 3 or 4 units of width;

and where $Q_i$ is a weighting factor value obtained from Table D:

As an illustrative example, the prototype for the right-character "5" (i.e., $E_{1321}$=(1321) as read from right-to-left) will now be calculated. For this example, assume that the bar preceding the first space was previously determined to be 1 unit wide. As previously calculated, the degree of distortion in this scan is 20.

For $Y_1$, $e_{i-1}$=1 and $e_1$=1, therefore $Q_1$=0

$Y_1$=(100*1)+(0*15)=100

For $Y_2$, $e_{2-1}$=1 and $_{e2}$=3, therefore $Q_2$=−2.5

$Y_2$=(300*1)+(−2.5*15)=262

For $Y_3$, $e_{3-1}$=3 and $e_3$=2, therefore $Q_3$=0.5

$Y_3$=(200*1)+(0.5*15)=208

For $Y_4$, $e_{4-1}$=2 and $e_4$=1, therefore $Q_4$=1

$Y_4$=(100*1)+(1*15)=115

Accordingly, the prototype vector $Y_{1321}$ for the right-character "5" equals ($Y_1$, $Y_2$, $Y_3$, $Y_4$) =(100, 262, 208, 115).

The remaining prototypes are calculated in a similar manner. For example, $Y_{2311}$ =(185, 293, 138, 100) and $Y_{2221}$ =(185, 200, 200, 115).

The distance between each of the prototype vectors $Y_n$ and the normalized measure widths in vector X are determined in accordance with the following equation:

$$Distance_n = \sum_{i=1}^{4}(Xi - Yi)^2$$

Accordingly, the distances between $Y_{1321}$ and X equal:

$D_{1321}=(178-100)^2+(280-262)^2+(161-208)^2+(81-115)^2 =9,773$ $D_{2311}=(178-185)^2+(280-293)^2+(161-138)^2+(81-100)^2=747$ $D_{2221}=(178-185)^2+(280-200)^2+(161-200)^2+(81-115)^2 =9,126$

The distance measurement for each character is compared against a threshold value T1, and if the distance is greater than the threshold value T1, the associated character is eliminated from consideration. From the remaining characters, the smallest distance measurement is subtracted from the second smallest distance measurement, and the result compared against a second threshold value T2, and if the result is greater than T2, the character associated with the smallest distance measurement is selected and information identifying the decoded character is provided to the host 4 computer.

For example, where $D_{1321}$=9,773, $D_{2311}$=747 and $D_{2221}$=9,126, and where T1=5,000 and T2=4,000, $D_{1321}$ and $D_{2221}$ are>T1(5,000) and therefore are eliminated from consideration, but may still used in determination of the best match prototype. The smallest distance $D_{2311}$=747 is subtracted from the second smallest distance $D_{2221}$=9,126 (i.e., 9,126-747=8,379) and the result is >T2(4000). Accordingly, the "4" character, which corresponds to the smallest distance $D_{2311}$ is selected as the decoded character.

In another embodiment, if a calculated prototype vector-to-character distance is greater than a predetermined threshold T3, the prototype is eliminated from consideration and will not be used in determination of the best match prototype.

While the foregoing embodiment, the distance measurement is a square function, other distance measurements can be used without departing from the scope of the present invention. Further, while specific values in Table D have been experimentally and empirically determined to facilitate formation of prototypes which enhance decoding capability, other values for Table D can be used.

In all the various embodiments shown, one dimensional bar codes were shown for illustrative purposes. However, in order to increase the amount of data that can be represented or stored on a given amount of surface area, several new bar code symbologies have recently been developed. One of these new code standards, Code 49, introduces a "two dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference. Another structure, known as "PDF417", is described in U.S. patent application Ser. No. 461,881 which is herein incorporated by reference.

It is understood that the present invention, while described with reference to one-dimensional bar codes, is equally applicable for use with "two-dimensional" codes or with PDF417.

What is claimed is:

1. A method for reading a bar code having a set of distortion attributes, said bar code comprising a number of encoded characters selected from a set of standard characters, said method comprising the steps of:
   i) scanning the bar code with a bar code scanner;
   ii) detecting an optical signal reflected back from the scanned bar code;
   iii) generating a digital signal corresponding to the scanned bar code;
   iv) decoding the digital signal by
      (a) calculating the set of distortion attributes of said scanned bar code;
      (b) forming a subset of standard characters from the set of standard characters;
      (c) modifying the subset of standard characters by the set of distortion attributes to form a group of prototype characters;
      (d) calculating a group of separation distances for each encoded character; and
      (e) selecting for each encoded character a match prototype character from the group of prototype characters using the group of separation distances; and
   v) producing output indicative of a information encoded in the bar code.

2. The method of claim 1, wherein a transition between a bar and a space is one of a number of transition types, wherein the step of calculating the set of distortion attributes comprises the step of calculating a transition distortion for each transition type.

3. The method in claim 2, wherein the bar code comprises a plurality of elements representing bars and spaces of various width and a transition type is dependent upon at least two adjoining elements.

4. The method in claim 2, wherein the bar code comprises a plurality of elements representing bars and spaces of various width, wherein a transition type is dependent upon a pair of adjoining elements.

5. The method of claim 2, wherein the step of calculating the transition distortion is performed by analyzing at least one of the number of encoded characters.

6. The method of claim 5, wherein the step of calculating the set of distortion attributes is performed by analyzing a start character.

7. The method of claim 5, wherein the step of calculating the set of distortion attributes is performed by analyzing a stop character.

8. The method of claim 5, wherein the step of calculating the set of distortion attributes is performed by analyzing a start and a stop encoded characters.

9. The method of claim 1, wherein the bar code comprises a plurality of elements representing bars and spaces of various width,
   wherein the step of calculating the set of distortion attributes further comprises the steps of:
      a) calculating a set of element distortions;
      b) forming a set of weighting factors; whereby each weighting factor represents a level of error for a particular element within a specific element combination; and
      c) calculating a scanned bar code distortion using the set of element distortions and the set of weighting factors.

10. The method of claim 9, wherein the step of calculating the scanned bar code distortion is performed using the following formula:

$$\text{Barcode Distortion} = (\Sigma(D_i/Q_{ci}))/N$$

where "i" is a sequential pointer to an element under test;
$D_i$ represents an element distortion for an element of the scanned bar code;
N represents the number of elements within the plurality of elements for which D has been determined;
"$c$" represents a particular bar-space combination which contains the element under test; and
$Q_{ci}$ is a weighting factor for element i under test, occurring within the present bar-space combination.

11. The method of claim 9, wherein the element distortion is calculated using the following formula:

$$\text{Element Distortion} = |100*\text{TRUNCATED}((X+50)/100)-X|$$

where X is a width of the element under test.

12. The method of claim 9, wherein each of the weighting factors within the set of weighting factors represents a level of error within a particular element of a single element pair.

13. The method of claim 1, wherein the step of forming a subset of standard characters comprises the steps of:
 a) normalizing the encoded characters of the scanned bar code;
 b) forming a subgroup of standard characters from the set of standard characters for each normalized encoded character using a preselection function; and
 c) combining the subgroups of standard characters to form the subset of standard characters.

14. The method of claim 13, wherein the preselection function rejects a number of standard characters that could not have been encoded in the scanned bar code, based upon a set of temporal characteristics of the normalized encoded characters.

15. The method of claim 1, wherein the step of modifying the subset of standard characters is performed on a per element basis.

16. The method of claim 1, wherein each separation distance within the group of separation distances is calculated using a predetermined distance function.

17. The method in claim 16, wherein the predetermined distance function is a Humming like distance.

18. The method in claim 16, wherein the predetermined distance function is a Single side Humming like distance.

19. The method in claim 16, wherein the predetermined distance function is a Square Humming like distance.

20. The method in claim 16, wherein the predetermined distance function is a Cubic Humming like distance.

21. The method in claim 16, wherein the predetermined distance function is a Diagonal distance.

22. The method in claim 16, wherein the predetermined distance function is a Character Normalization Diagonal distance.

23. The method in claim 16, wherein the predetermined distance function is a Square Diagonal distance.

24. The method in claim 16, wherein the predetermined distance function is a Minimum Square Diagonal distance.

25. The method in claim 16, wherein the predetermined distance function is a Propagating Diagonal distance.

26. The method in claim 16, wherein the predetermined distance function is an Edge Shift distance.

27. The method in claim 16, wherein the predetermined distance function is a Distortion Binary distance.

28. The method in claim 1, wherein the step of selecting a match prototype character for each encoded character comprises the steps of:
 a) coarse-filtering the group of separation distances to an encoder character to reduce the number of possible matches to the encoded character; and
 b) fine-filtering the remaining separation distances to the encoded character to select a match separation distance and the corresponding prototype character.

29. The method in claim 28, wherein the step of course-filtering further comprises the steps of:
 a) comparing all the separation distances to the encoded character against a T1 threshold; and
 b) rejecting a prototype character if its corresponding separation distance to the encoded character is greater than T1.

30. The method in claim 29, wherein the step of fine-filtering further comprises the steps of:
 a) picking a smallest separation distance Ds1 from the nonrejected separation distances to an encoded character;
 b) picking a second smalest separation distance Ds2 from the nonrejected separation distances to the encoded character;
 c) calculating a distance difference between Ds2 and Ds1, for each encoded character; and
 d) for each encoded character select the match prototype character associated with the Ds1 to represent the encoded character if the distance difference is greater than T2.

31. The method of claim 1, wherein the bar code is a binary bar code.

32. The method of claim 1, wherein the bar code is a delta bar code.

33. The method of claim 8, wherein each separation distance within the group of separation distances is calculated using a predetermined distance function.

34. The method in claim 33, wherein the predetermined distance function is a Humming Like distance.

35. The method in claim 34, wherein the step of selecting a match prototype character for each encoded character comprises the steps of:
 a) coarse-filtering the group of separation distances to an encoded character to reduce the number of possible matches to the encoded character; and
 b) fine-filtering the remaining separation distances to the encoded character to select a match separation distance and the corresponding prototype character.

36. The method in claim 35, wherein the step of course-filtering further comprises the steps of:
 a) comparing all the separation distances for an encoded character against a T1 threshold; and
 b) rejecting a prototype character if its corresponding separation distance to the encoded character is greater than T1.

37. The method in claim 36, wherein the step of fine-filtering further comprises the steps of:
 a) picking a smallest separation distance Ds1 from the nonrejected separation distances to an encoded character;
 b) picking a second smallest separation distance Ds2 from the nonrejected separation distances to the encoded character;
 c) calculating a distance difference between Ds2 and Ds1, for each encoded character; and
 d) for each encoded character select the match prototype character associated with the Ds1 to represent the encoded character if the distance difference is greater than T2.

38. The method of claim 37, wherein the bar code is a binary bar code.

39. The method of claim 38, wherein the bar code is a code39 bar code.

40. The method of claim 8, wherein the bar code comprises a plurality of elements representing bars and spaces of various width, wherein the step of calculating the set of distortion attributes further comprises the steps of:
a) calculating a set of element distortions;
b) forming a set of weighting factors, whereby each weighting factor represents a level of error for a particular element within a specific element combination; and
c) calculating a scanned bar code distortion using the set of element distortions and the set of weighting factors.

41. The method of claim 40, wherein the step of calculating the scanned bar code distortion is performed using the following formula:

$$\text{Barcode Distortion} = (\Sigma(D_i/Q_{ci}))/N$$

where "i" is a sequential pointer to an element under test;
$D_i$ represents an element distortion for an element of the scanned bar code, said element distortion being set to 0 when the distortion is in an opposite direction from an expected distortion direction;
N represents the number of elements within the plurality of elements for which D has been determined;
"$c$" represents a particular bar-space combination which contains the element under test; and
$Q_{ci}$ is a weighting factor for element i under test, occurring within a particulat bar-space pattern.

42. The method of claim 41, wherein the element distortion is calculated using the following formula:

$$\text{Element Distortion} = |100 * \text{TRUNCATED}((X+50)/100) - X|$$

where X is the width of the element under test.

43. The method of claim 42, wherein the step of forming a subset of standard characters comprises the steps of:
a) normalizing the encoded characters of the scanned bar code;
b) forming a group of standard characters from the set of standard characters for each normalized encoded character using a preselection function; and
c) combining the subgroups of standard characters to form the subset of standard characters.

44. The method of claim 43, wherein the step of modifying the subset of standard characters is performed on a per element basis.

45. The method of claim 44, wherein each separation distance within the group of separation distances is calculated using a predetermined distance function.

46. The method in claim 45, wherein the predetermined distance function is a Humming Like distance.

47. The method in claim 46, wherein the step of selecting a match prototype character for each encoded character comprises the steps of:
a) coarse-filtering the group of separation distances to an encoder character to reduce the number of possible matches to the encoded character; and
b) fine-filtering the remaining separation distances to the encoded character to select a match separation distance and the corresponding prototype character.

48. The method in claim 47, wherein the step of course-filtering further comprises the steps of:

a) comparing all the separation distances to an encoded character against a T1 threshold; and
b) rejecting a prototype character if its corresponding separation distance to the encoded character is greater than T1.

49. The method in claim 48, wherein the step of fine-filtering further comprises the steps of:
a) picking a smallest separation distance Ds1 from the nonrejected separation distances to an encoded character;
b) picking a second smallest separation distance Ds2 from the nonrejected separation distances to the encoded character;
c) calculating a distance difference between Ds2 and Ds1, for each encoded character; and
d) for each encoded character select the prototype character associated with the Ds1 to represent the encoded character if the distance difference is greater than T2.

50. The method of claim 49, wherein the bar code is a delta bar code.

51. The method of claim 50, wherein the bar code is a UPC bar code.

52. An apparatus for reading a bar code having a set of distortion attributes, said bar code comprising a number of encoded characters selected from a set of standard characters, said apparatus comprising:
i) a scanner for scanning the bar code, detecting an optical signal reflected back from the bar code and generating a digital signal corresponding to the scanned bar code; and
ii) a decoder for receiving said digital signal from said scanner, said decoder including
(a) a distortion analyzer for calculating a set of distortion attributes of said scanned bar code;
(b) a first selector for selecting a subset of standard characters from the set of standard characters;
(c) a modifier for modifying the subset of standard characters by the set of distortion attributes calculated by the distortion analyzer to form a group of prototype characters;
(d) a distance analyzer for calculating a group of separation distances for each encoded character; and
(e) a second selector for selecting for each encoded character a match prototype character from the group of prototype characters using the group of separation distances.

53. A process of reading a binary bar code, wherein the binary bar code comprises a calibration segment and an encoded segment, the encoded segment representing one or more encoded characters selected from a plurality of standard characters, each encoded character comprises a plurality of adjacent alternating first elements and second elements, each of the first elements and the second elements having a width selected from M permitted widths, and wherein there are a predetermined number of possible transition types between adjacent elements, the calibration segment comprising a predetermined pattern of alternating first elements and second elements, each element having one of said M permitted widths and wherein the predetermined pattern includes one or more of said possible transition types between adjacent elements, the process comprising;
i) scanning the bar code with a bar code scanner;
ii) detecting an optical signal reflected back from the scanned bar code;
iii) generating a digital signal corresponding to the scanned bar code;

iv) decoding the digital signal by
  (a) measuring the widths of the elements of each of the ones or more possible transition types in the calibration segment for determining first calibrating results;
  (b) forming a prototype for each encoded character of said plurality of encoded characters on the basis of the first calibrating results;
  (c) measuring the widths of the elements in the encoded segment; and
  (d) comparing the measured widths of the elements in the encoded segment against each of said prototypes for determining which of the standard characters are represented by the encoded segment; and
v) producing output indicative of a information encoded in the bar code.

* * * * *